July 26, 1960     R. BAJULAZ     2,946,596
PICK-UP ARM FOR SPEAKING MACHINE
Filed Sept. 16, 1958     3 Sheets-Sheet 1
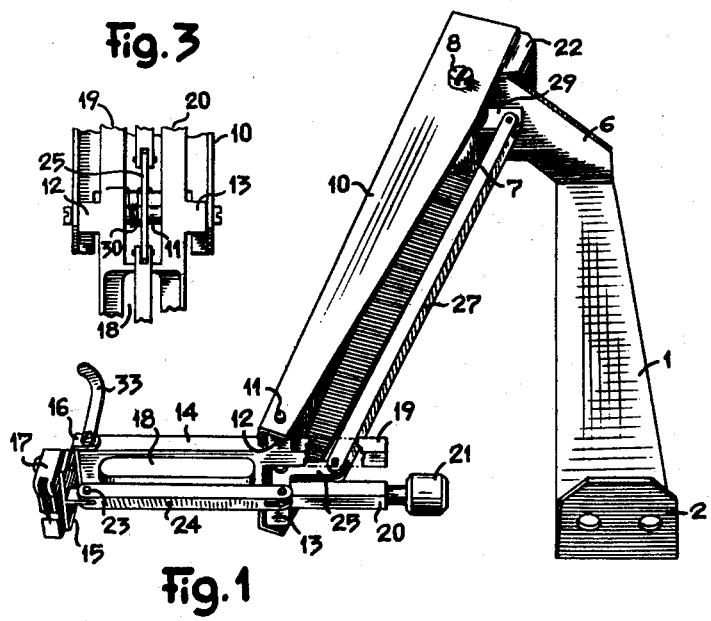
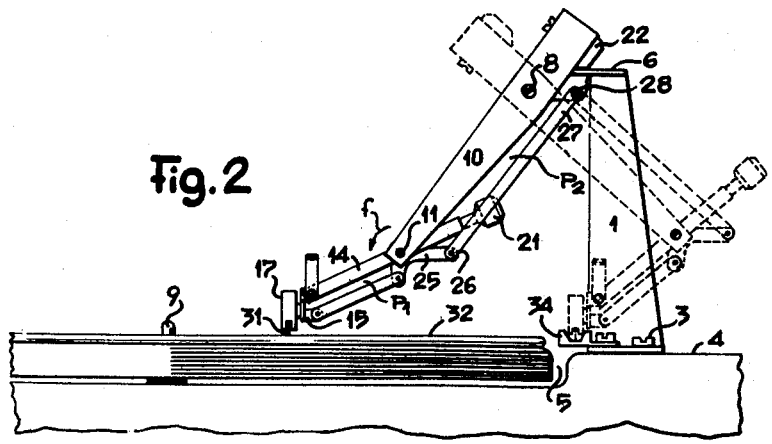

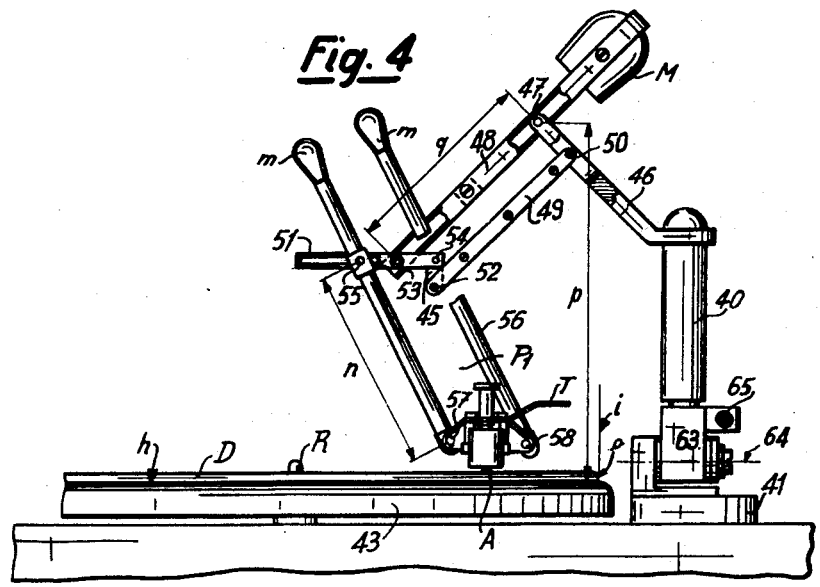
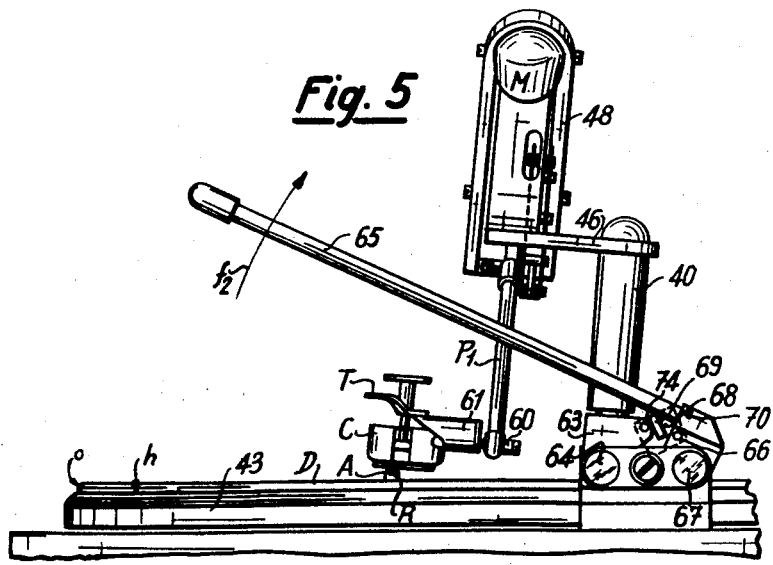

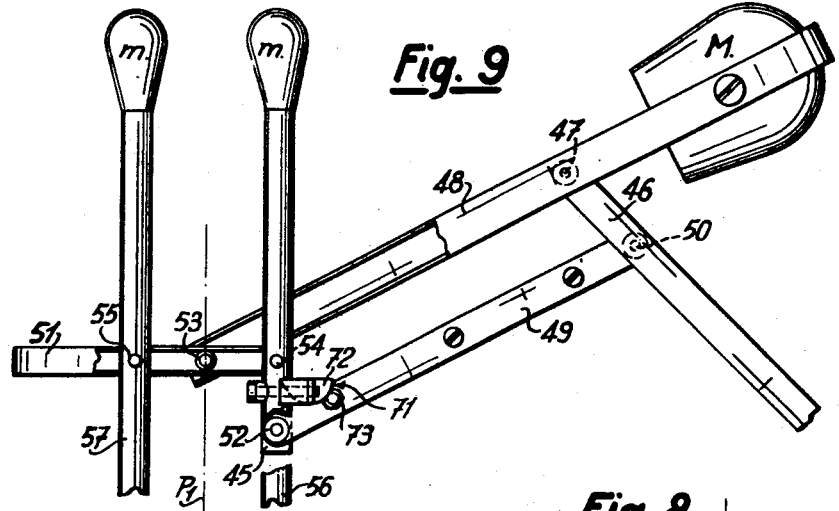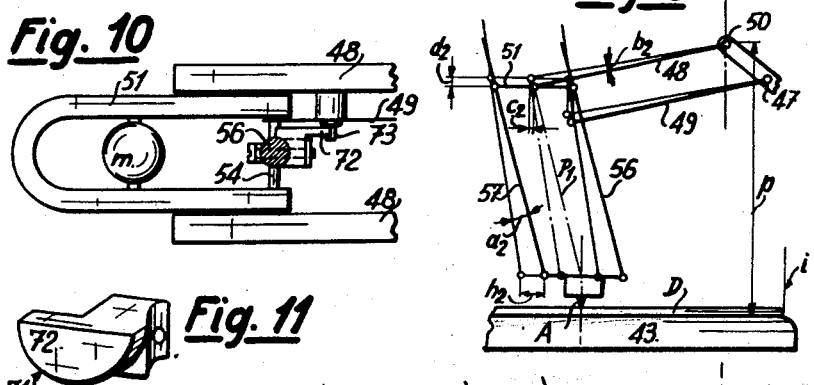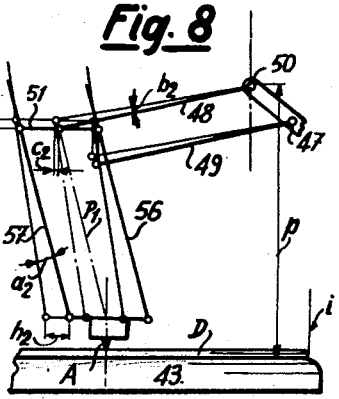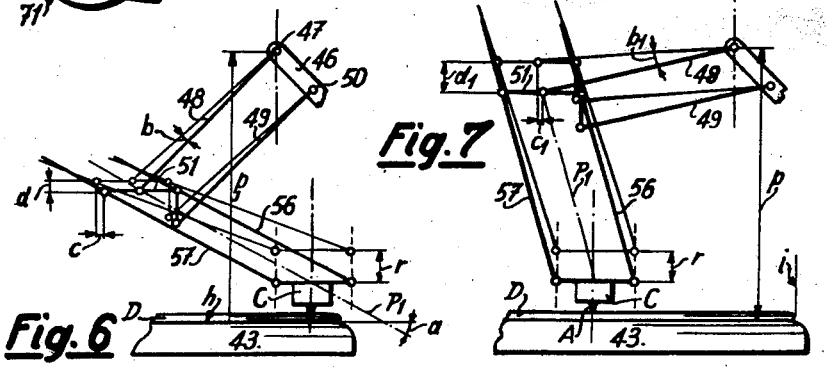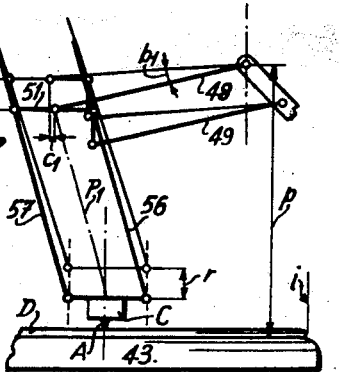

United States Patent Office  
2,946,596  
Patented July 26, 1960

2,946,596

PICK-UP ARM FOR SPEAKING MACHINE

Roger Bajulaz, Renens, Switzerland, assignor to Thorens S.A., Sainte-Croix, Switzerland, a corporation of Switzerland Filed Sept. 16, 1958, Ser. No. 761,337

Claims priority, application Switzerland Sept. 23, 1957

12 Claims. (Cl. 274—23)

The present invention relates to a pick-up arm for speaking machine.

The very high working precision now requested for speaking machines leads for the construction of the pickup arm especially, to conditions which are difficult to meet entirely.

Said conditions are essentially the following:

(1) The oscillation plane of the needle tip must be permanently perpendicular to the tangent to the groove at the contact point, that is to say, must be in a plane radial with respect to the turn-table.

(2) The contact between the needle tip and the groove of the record must remain perfect, even for a weight on the record reduced to almost one gram.

(3) The pick-up arm must be statically balanced as well with respect to the vertical swivelling axis as with respect to the horizontal swivelling axis.

(4) The mass swivelling around the vertical axis and around the horizontal axis must remain as reduced as possible.

(5) The distance between the horizontal swivelling axis and the needle tip must be as great as possible in order that the variations of the relative filing off speed of the groove with respect to the needle caused by the local undulations of the surface of the record remain the smallest as possible.

A standard pick-up arm is defined by the four following basic geometrical elements:

(A) Distance between turn-table axis and vertical swivelling axis of the arm base.

(B) Distance between needle tip and vertical swivelling axis.

(C) Distance between needle tip and horizontal swivelling axis of the arm. Said axis is fastened on the base swivelling around the vertical axis.

(D) Angle between the vertical plane in which the needle tip oscillates and the plane defined by the vertical swivelling axis and the needle tip. To each distance indicated under B corresponds a distance indicated under A and an angle indicated under D optimum and the more said distance indicated under B is great, the more it will be easy to meet the above enumerated condition 1, but with prejudice to the above conditions 2 and 4. Likewise in order to reduce the most possible the forces acting on the needle tip and due to the local undulations of the surface of the record, it would be necessary to reduce the distance indicated under C, but the condition 5 asks on the contrary that said distance should be the greatest possible.

One has tried to avoid these difficulties by designing a so called "tangential" arm in which a system of levers acting as an articulated parallelogram in the horizontal plane allows to modify the angle indicated under D according to the radius of the grove to be reproduced, so as to meet as much as possible the condition 1. However, said type of arm is difficult to realize so as to permit the reproduction of records of large diameter and to meet at the same time the conditions 2 and 4.

One knows likewise pick-up arms of radial design constituted essentially by a horizontal guiding rail along which rolls or glides a mobile set. Said type of design meets perfectly the condition 1, but not at all the condition 5, as the distance indicated under C is here very short. Furthermore, the necessity of making the whole guiding rail to pivot around a vertical axis located outside the turntable in order to enable the disengagement of said guiding rail at the time of record changing leads to great bulkiness.

The pick-up arm according to the invention which differs entirely by its conception from known pickup arms, meets all the imposed conditions. It is characterized by the fact that it is constituted by a first arm carrying at its extremity the pick-up head and hinged on a second arm pivoted on a gallow fixed on the frame of the speaking machine, said two arms being movable with respect to the plane of the turn-table, statically counter balanced for all the positions which they can take and leading the needle tip in a radial plane going through the rotation axis of the turn-table.

The accompanying drawing shows, schematically and by way of example, two embodiments of the pick-up arm according to the invention.

Fig. 1 is a perspective side view partially cut away.

Fig. 2 is a side view of the pick-up arm mounted on the frame of the speaking machine partially shown and showing the two extreme positions which can take the arm by its displacement with respect to the turn-table.

Fig. 3 is a partial view from under the arm showing a detail of design.

Fig. 4 is a front view of the second embodiment of the arm mounted on the speaking machine, certain parts being cut away.

Fig. 5 is a side view of the arm, the needle being maintained in a lifted position.

Figs. 6 to 8 are diagrams showing the working of the pick-up arm.

Fig. 9 is a partial side view at a great scale of the pick-up arm.

Fig. 10 is a top view of the Fig. 9.

Fig. 11 is a perspective view of a detail.

The pick-up arm shown in Figs. 1 to 3 is constituted by a support 1, the base-plate 2 of which is at right angles is fastened by two screws 3 on the upper face 4 of the frame of the speaking machine, close to the turn-table 5. Said support 1 comprises at its upper part an overhanging arm 6, parallel to the base-plate 2 and forming with the support a gallow. The lower face of the arm 6 is provided with a transversal boss 7, the axis 8 of which is parallel to the surface of the turn-table 5 and perpendicular to a radial plane going through the rotation axis 9 (Fig. 2) of the turn-table 5.

An arm 10 having U cross-section and thin wall is articulated at its upper part on said axis 8, so as to oscillate parallelly to a radial plane going through the axis 9 of the turn-table 5. The lower extremity of the arm 10 comprises an axis 11 parallel to the axis 8 and on which is pivoted an arm 14. Bosses 12, 13 or spacing members maintain the axial position of the arm 14 along the axis 11. A support constituted by a small plate 15 hinged at its upper part on an axis 16 parallel to the axis 8 and 11 and disposed at the front extremity of the arm 14 directed towards the axis 9 of the turn-table 5, carries th pick-up head 17. The fore part of the arm 14 is hollowed out at 18, whilst its rear part prolongs by two rods 19, 20 one of which is provided with a counter-weight 21 counter balancing the weight of the fore part of the arm. At the upper extremity of the arm 10 is disposed a counter-weight 22 counter balancing the whole of the two arms 10 and 14 with respect to the axis 8.

A mechanical connection forming with the arms 10 and 14 two deformable parallelograms $P_1$ and $P_2$ connects the support 15 of the pick-up head 17 to the gallow. Said mechanical connection comprises, on the one hand, a rod 24, the extremities of which are articulated respectively on a wing 23 fastened to the support 15 and on one of the arms of a lever 25 freely pivoted on the axis 11 and, on the other hand, a rod 27 the extremities of which are respectively articulated on the second arm of the lever 25 and on a rib 29 fastened to the arm 6 of the gallow. A spring 30 (Fig. 3) mounted on the pivot axis 11 of the arm 14 and bearing on the lever 25, tends to displace angularly the arm 14 in the direction of the arrow $f$ in order to maintain the pick-up needle 31 in contact with the record 32 with the desired pressure.

In a variant, said pressure device could comprise an adjusting screw allowing to adjust the pressure of the needle 31 on the record 32.

An operating member 33 fastened to the fore part of the arm 14 permits to lift and displace it with respect to the record 32. Fig. 2 shows the working end position of the pick-up (in full lines) and its rest position (in dotted lines). A support 34 fastened to the base-plate 2 is provided for laying the pick-up, outside the periphery of the turn-table 5.

During the oscillation of the arm 10, the upper side of the parallelogram $P_2$, constituted by the rib 29, remains fixed and parallel to the upper face of the turn-table 5. It follows that the opposite side of said parallelogram constituted by one of the arms of the lever 25 remains likewise parallel to the upper face of the turn-table. Consequently, the second arm of the lever 25, which is perpendicular to the first one, remains motionless but perpendicular to the turn-table 5. Said second arm forming one of the sides of the parallelogram $P_1$, the opposite side, that is the plate 15 carrying the pick-up head 17, remains likewise motionless and perpendicular to the turn-table 5 during the oscillating movement of the arm 10 corresponding to the radial movement of the pick-up needle on the record 32 during the hearing of said record. When a local undulation of the record 32 occurs, the pick-up head head 17 and its support 15 move perpendicularly to the surface of the record without provoking a modification of the angular position of the lever 25 and thus by remaining in a plane perpendicular to the face of the turn-table.

The advantages of the described pick-up arm are obvious. The oscillating movement of the arms 10 and 14 which are leading the needle tip into a radial plane going through the rotation axis of the turn-table permits to meet entirely the above mentioned conditions 1 to 5. Furthermore, the arms 10 and 14 can be designed so as to have a minimum mass and a great rigidity, what allows to obtain a static balance of the two arms without having a too heavy counterweight and thus to meet the above mentioned conditions 2, 3 and 4.

The embodiment shown in Figs. 4 to 11 is more especially foreseen in order to reduce to a minimum the disadvantages due to a warped record.

It happens frequently that the speaking machines records become warped during their storage, so that they bear no more on the turn-table with their whole surface, but only with some points. In this case, the needle engaged into the recording grooves slides on a warped surface and undergoes, consequently, vertical displacements which, owing to the inertia of the pick-up arm, are the cause of variations of the vertical and horizontal thrusts exerted by the needle on the walls of the groove.

Now, one finds that during the hearing of a warped record, the pick-up needle undergoes stronger vertical accelerations when it is engaged into the first recording grooves than when it is engaged into the record end groove. On the contrary, when the needle is engaged into said record end groove of a flat or warped record and which presents a great pitch for controlling the automatic stopping of the speaking machine, the horizontal acceleration exerted on the needle by said groove is greatly increased, so that the horizontal thrust exerted by the needle on the walls of the groove is stronger when it is engaged into the record end groove than when it is engaged in the first recording grooves.

It is clear that the more constant the vertical thrust exerted by the needle is, the better will be the recording accuracy and the smaller the wear of the record. Furthermore, it is necessary to avoid that the horizontal thrust exerted by the needle on the groove walls may reach a sufficient value to make the needle jump out of the groove.

In the embodiment of Figs. 4 to 11, the pick-up arm comprises a first arm $P_1$ constituted by a deformable parallelogram, carried by an arm 48 articulated on a gallow formed by a column 40 and an arm 46.

The arm $P_1$ is constituted by two parallel rods 56, 57 connected one to another by two cross members 51 and 60 articulated at 54, 55, 58 and 59 on said rods 56 and 57. The cross member 60 connecting the lower ends of the two rods 56, 57 carries a support 61 on which is fastened a pick-up head C provided with its needle A.

The rods 56 and 57 extend beyond the cross member 51 and carry each on their free end a counter-weight $m$.

The arm 48 is constituted by a sectional iron bent in a U form. The ends of the wings of said U are hinged at 53 on the cross member 51 at an equal distance from the two articulations 55, 54. Said arm 48 extends beyond its articulation 47 and carries, fastened in the middle part of the U, a balancing counter-weight M of a sufficient mass in order to statically counter-balance not only the arm 48, but likewise the arm $P_1$ provided with its counter-weights $m$.

The pick-up arm shown comprises a guiding device tending to maintain the cross member 51, and consequently the cross member 60, in a plane parallel to the plane $h$ of the turn-table 43. Said guiding device comprises a rod 49 substantially parallel to the arm 48 and one of the ends of which is hinged at 50 on the arm 46 of the gallow whilst its other end is hinged at 52 on a plate 45 rigidly fastened on the cross member 51.

The length $n$ of the first arm $P_1$ and the height $p$ of the articulation point 47 of the second arm 48 on the gallow above the plane $h$ of the turn-table 43 are such that when said first arm $P_1$ is nearly vertical, the second arm 48 is nearly horizontal. Further, the articulation 47 of the second arm 48 on the gallow is situated inside a cylinder generated by a generatrix $i$ parallel to the axis R of the turn-table and bearing on the peripherical edge $o$ of the largest record D to be played placed on the turn-table 43. Moreover, the lenth $q$ of the second arm 48 is such that when the needle is engaged into the record end groove, the first arm $P_1$ is nearly vertical.

When said various conditions are met, one obtains the following working illustrated by the diagrams of Figs. 6 and 7:

(1) When the pick-up needle A is engaged into the first recording groove carried by the record D (Fig. 6), the inclination angle $a$ of the arm $P_1$ on the plane $h$ of the turn-table 43 is smaller than 45° and preferably comprised between 10° and 30°. When, owing to the warping of the record D, the needle A is vertically repelled upwards, for instance by a value $r$, the arm $P_1$ is likewise repelled upwards and causes an angular displacement $b$ of the arm 48. One notices that said angular displacement causes a translation of the cross-member 51 whose horizontal component $c$ and vertical component $d$ are small in comparison to the amplitude of the vertical displacement $r$ of the needle A. It follows that the vertical and horizontal components of the accelerations which the needle A must impart to the whole pick-up arm are small and consequently the increases of the vertical and horizontal thrusts, exerted by the needle on the record as a result of said accelerations, are small. This is the result of the fact that the vertical displacement of the needle A provokes chiefly an oscillation of the arm $P_1$ which is very light and is counter-balanced by the masses $m$ and only an angular displacement of a small amplitude of the arm 48 which is also counter-balanced by the mass M but presents a larger mass, its design having to be stronger.

The needle A being always located in a plane tangential to the groove into which it is engaged, as owing to its design the pick-up arm leads said needle in a radial plane going through the axis R of the turn-table 43, it follows that normally the needle A exerts no lateral thrust on the walls of the groove of an even record. Consequently, the small horizontal thrust due to the horizontal acceleration which a needle engaged into the groove of a warped record must impart to certain part of the pick-up arm, can by no means reach a sufficient value to cause the needle to jump out of the groove.

On the contrary, the increase of the vertical thrust, due to the vertical acceleration which the needle must impart to certain parts of the pick-up arm, is reduced to a very small value and near to the minimum value which is obtained for a vertical position of the arm 48 and a horizontal position of the arm $P_1$, but which is not realizable constructively for practical reasons, the setting in place and the taking away of the record to be played becoming then operations uneasy to perform.

(2) On the contrary, the more the needle A approaches the last recording grooves (Fig. 7), the more the arm $P_1$ approaches a vertical position and the arm 48 approaches a horizontal position, so that when the needle A glides along the record end groove, the arm $P_1$ is practically vertical. Now, one notices at once that for such a position the vertical displacement $r$ of the needle, due to the warping of the record, causes chiefly a vertical translation $d_1$ of the arm $P_1$ and an angular displacement $b_1$ of the arm 48; the horizontal component $c_1$ of the translation movement of the cross member being unimportant and even reduced to zero for the vertical position of the arm $P_1$. In such conditions, the variations of the vertical thrust exerted by the needle on the record D, and due to the vertical accelerations which it must impart to certain parts of the pick-up arm when it glides into the record end groove of a warped record, present thus, for a vertical displacement of the needle A of the same amplitude, greater values when it is engaged into the record end groove than when said needle is engaged into the first recording grooves. However, as the accelerations imparted to the needle by a warped record are decreasing from the outer diameter towards the centre, the value of the vertical thrusts exerted by the needle on the record remain within acceptable limits whatever may be the position of the needle along the recording groove.

On the contrary, when the needle is engaged into the eccentric record end groove, the horizontal accelerations transmitted to said needle can be high. But, in the corresponding position of the pick-up arm, as shown on Fig. 8, a horizontal displacement $h_2$ of the needle A causes chiefly an angular displacement $a_2$ of the arm $P_1$ having a small mass, whilst the horizontal displacement $c_2$ and vertical displacement $d_2$ of the point 55 are very small as well as the angular displacement $b_2$ of the arm 48. In such conditions, the horizontal thrusts exerted on the needle are minimum ones and can never reach a sufficient value to cause the needle to jump out of the groove.

In the embodiment shown, the pick-up arm is further provided with a lifting up device.

The column 40 comprises a base 63 articulated on a socle 41 by means of a horizontal axis 64 parallel to the radial plane in which is situated the needle A. A control device allows to tilt said column 40. Said control device comprises, on the one hand, an operating lever 65 articulated with respect to the socle 41 by the intermediary of an axis 67 parallel to the articulation axis 64 of the column 40, and, on the other hand, of a link 68 articulated by one of its ends at 66 on the lever 65 and by its other end at 76 on the base 63. A nose 69 fastened to said link and situated in its middle part constitutes an abutment onto which a resting face 70 of the lever 65 is bearing to define the working position (Fig. 4) of the column 40, for which said column is parallel to the axis R of the turntable.

The lifting up device of the needle comprises further a finger 73 fastened on the rod 49, and a cam 72 fastened on the rod 56 of the deformable parallelogram $P_1$.

When, by actuating the lever 65 in the direction of the arrow $f_2$, the user causes a back tilting of the column 40, for example up to the position shown in Fig. 5, the angle formed by the arms 48 and $P_1$ opens until the profile 71 of the cam 72 comes to bear on the finger 73. From that moment, said finger 73 prevents an oscillation of the arm $P_1$ and said arm is driven by the lever 48 and the rod 49 into the displacement of the column 40.

Thus, the needle leaves the groove and is driven up to a lifted position (Fig. 5) for which it can by no means come into contact with the record D placed on the turntable. An operating member T fastened to the support 61 permits then to displace radially the needle and to bring said needle above any one of the recording grooves. Then, by pulling down the lever 65, the user provokes the lowering of the needle A and its engagement into the desired groove.

The profile 71 of the cam 72 is such that for all the playing positions of the needle A along a recording groove, the finger 73 remains out of reach of said cam 72, but that, on the contrary, said finger comes to bear onto said cam as soon as the user tilts the column 40.

Furthermore, the profile 71 of the cam 72 is such that when the column 40 is tilted (Fig. 5) the needle A is maintained in the lifted position for all the relative positions of the two arms $P_1$ and 48 of the pick-up arm and, moreover, the frictions between the finger and the cam are sufficient to maintain the two arms 48 and $P_1$ in any desired relative position.

Said needle lifting up and setting down device allows the user not only to set down, without risks of record deterioration, the needle into the first recording grooves, but further to lift up the needle during the hearing of a record or further, in the case of records bearing various recordings on a same face, to play any one of said recordings.

Two embodiments of the pick-up arm for speaking machine have been described here with reference to the attached drawing, but it goes without saying that many variants may be foreseen without departing from the scope of the claimed protection.

I claim:

1. A pickup arm for a talking machine having a frame, a turntable axis supported by said frame and a turntable revolving around said axis, said pickup arm comprising a gallows rigidly fastened to said frame, a first deformable parallelogram, a pickup head provided with a needle mounted on a support connected to said first deformable parallelogram, a second deformable parallelogram connected to said first deformable parallelogram and also to said gallows, hinging means connecting said gallows, said first and second deformable parallelograms and said support in their relative positions, the axes of said hinging means being perpendicular to a radial plane containing said axis of said turntable whereby the tip of said needle is guided in said radial plane containing said turntable axis.

2. A pickup arm as claimed in claim 1 and in which said first deformable parallelogram comprises a first arm and a first guide member and in which said second deformable parallelogram comprises a second arm and a second guide member, said first and second arms being statically counterbalanced for all the playing positions of said needle.

3. A pickup arm as claimed in claim 2 in which a spring acting on said first arm maintains the pickup needle in contact with a record to be played.

4. A pickup arm as claimed in claim 2 and in which the axis of the hinging means of said second arm on said gallows is located within a cylinder generated by a generatrix parallel to said turntable axis and bearing on the peripheral edge of the largest record to be played and in which the height of said hinging means above the plane of said turntable as well as the lengths of said first and second arms are such that when the needle is engaged into the record end groove, said first arm is nearly vertical while said second arm is nearly horizontal.

5. A pickup arm as claimed in claim 4 and in which, when said pickup needle is engaged into the first grooves of the record presenting the largest diameter, said first arm forms with said turntable plane an angle smaller than 45°, so that the vertical displacements of said needle gliding in the groove of a warped record cause an oscillation of said second arm of a small amplitude with respect to the amplitude of the oscillation of said first arm.

6. A pickup arm as claimed in claim 5 and in which said first arm is constituted by a deformable parallelogram one of the small side members of which carries said pickup head, while the middle point of the second small side member of said parallelogram is pivoted to said second arm.

7. A pickup arm as claimed in claim 6 and comprising a piece rigidly fastened to said second small side member of said first deformable parallelogram, a rod pivoted to the arm of said gallows and to said piece to maintain said small side members of said first deformable parallelogram parallel to the plane of said turntable.

8. A pickup arm as claimed in claim 7 and comprising a lifting device of said pickup needle.

9. A pickup arm as claimed in claim 8 and in which said lifting device comprises a column of said gallows pivoted with respect to the frame of the machine along an axis parallel to said radial plane in which said needle is guided.

10. A pickup arm as claimed in claim 9 and in which said lifting device further comprises a first abutment carried by one of the members connecting said first arm to said gallows and a second abutment carried by one of the members of said first arm whereby said first and second abutments come into contact upon an angular displacement of said column out of its vertical playing position, and lift said needle.

11. A pickup arm as claimed in claim 10 and in which one of said abutments is constituted by a cam whose profile and relative position with respect to the other abutment are such that on the one hand, the pickup needle engaged into a recording groove is able to follow freely said groove and, on the other hand, the needle in its lifted position is able to be displaced and brought above any one of the recording grooves carried by the record.

12. A pickup arm as claimed in claim 11 in which the relative positions of said first and second abutments, as well as the state of their surface are such when the abutment is in contact with the profile of the cam, friction prevents any gliding of said abutment along the profile of the cam.

References Cited in the file of this patent

UNITED STATES PATENTS

| | | |
|---|---|---|
| 855,761 | Elfering | June 4, 1907 |
| 1,394,509 | Nadel | Oct. 18, 1921 |
| 1,592,117 | Bishop et al. | July 13, 1926 |
| 2,837,339 | Rhodes et al. | June 3, 1958 |

FOREIGN PATENTS

| | | |
|---|---|---|
| 65,292 | Austria | Oct. 20, 1910 |
| 251,731 | Germany | Oct. 14, 1911 |
| 558,504 | Germany | Sept. 8, 1932 |